March 28, 1961 J. LAMB 2,976,881
PRESSURE RELIEF VALVE
Filed May 21, 1958
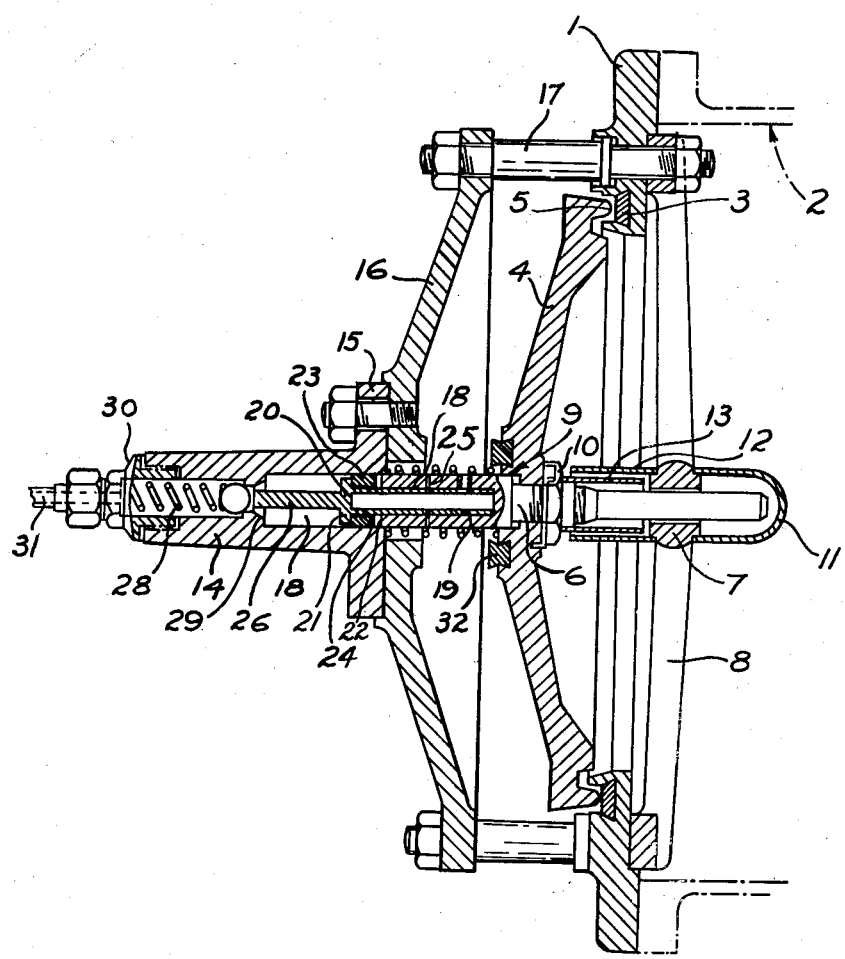
INVENTOR.
JOHN LAMB
BY Robertson and Youtie
ATTORNEYS

United States Patent Office 2,976,881
Patented Mar. 28, 1961

2,976,881
PRESSURE RELIEF VALVE
John Lamb, London, England; Albert Briggs and William Edward Holden, executors of said John Lamb, deceased, assignors to John Lamb Publications and Inventions Limited, London, England, a British company
Filed May 21, 1958, Ser. No. 736,745
5 Claims. (Cl. 137—488)

This invention relates to a pressure relief valve, for example a relief valve for safeguarding an electric furnace against excessive internal pressure resulting from an explosion or other cause, for which bursting discs or spring-loaded relief valves do not provide adequate protection.

Relief valves according to the invention may be used with advantage in connection with vacuum or pressure vessels generally where a relief valve is required. The invention may also be used for example as a safeguarding measure in enclosed engine crankcases to give protection against pressures resulting from explosions. In the following description electric furnaces will be referred to more particularly, as an example of the apparatus with which the invention may be used.

Electric furnaces operated under vacuum or in an inert atmosphere are used for the melting and refining of many refractory metals, such as molybdenum, titanium, zirconium, and are also being used increasingly for specialised alloy steels. They operate at temperatures which may be in excess of 2000° C. and the furnace casing is maintained at a safe temperature either with a water jacket or by circulating water in a coil of tubing attached to the casing.

Under certain circumstances parasitic arcs may develop or other circumstances arise whereby the inner wall of the jacket is penetrated by the arc or molten metal causing water to leak from the cooling jacket into the furnace. This is an extremely dangerous condition and an explosion almost inevitably results as large quantities of steam are generated. Steps can be taken to prevent the parasitic arcs developing but as such may fail provision must also be made to relieve any excess pressure that may arise from such failure.

The explosion itself probably has a primary and a secondary stage, and it is important that the relief valve should close instantly to prevent the secondary stage explosion following the shock wave and subsequently inrush of air. The secondary explosion is caused by the immediate oxidation of the very hot molten metal and by reaction of air with atomic hydrogen.

As these furnaces work under a high vacuum it is important that air should not leak into them. Any provision made to relieve excess pressure must therefore be absolutely air-tight.

According to this invention there is provided a relief valve comprising a disc for opening and closing a relief port in an electric furnace or other chamber, an external axial plunger carried by the disc and slidable within a cylinder, a valve in the cylinder operable by the plunger and controlling the admission of loading air to the cylinder for applying pressure to the plunger to close the relief valve, and means to delay the action of the loading air to close the relief valve until the latter is fully opened, the arrangements being such that the relief valve will operate to relieve pressure within the furnace or other chamber and will close substantially without permitting air to enter therein.

In order that the invention may be clearly understood an embodiment of the invention will now be described, by way of example, in relation to the accompanying drawings and as applied to an electric furnace working under vacuum.

In the drawings:
The sole figure is a sectional view of a pressure relief valve embodying the invention.

A pressure relief opening in the wall 1 of the furnace indicated generally at 2 has a gasket 3 of resilient material such as neoprene let into a dovetail groove adjacent the edge of the opening. Closing the relief opening is an outwardly dished explosion disc 4 having a bead 5 at its periphery for seating on the gasket 3 to form a gas tight seal. Axially of the explosion disc 4 is a shaft 6 which projects on both sides of the disc 4. One end of the shaft 6 extends into the furnace where it is centred and slidably mounted in the boss 7 of a spider 8 secured to the interior wall 1 of the furnace. The outwardly extending and larger diameter part of the shaft 6 seats in a recess 9 in the disc 4 and is clamped therein by a nut 10 on the reduced diameter part of the shaft, the nut being locked by any suitable means. The part of the shaft within the furnace may be protected by cylindrical shields 11, 12, 13. Two of the shields 11 and 12 are secured to the boss 7 of the spider 8 and the other 13 to the nut 10 on the disc 4, the shield 13 being disposed within the outer shield 12. The larger diameter part of the shaft 6 constitutes a plunger which is slidable within a cylinder 14 having a flange 15 which is bolted to an outwardly dished and circular plate 16. This plate 16 is secured adjacent its periphery to the furnace wall 1 by studs 17 which offset the plate 16 from the wall 1. Conveniently, the studs 17 may project through the wall 1 and afford means for securing the spider 8 to the inner surface of the wall 1. The plunger has an axial hole 18 in which is fixed a tubular member 19 which projects from the plunger. The member 19 is closed intermediate its length by a wall 20 at which position the member 19 is formed with a flange 21 having a diameter less than that of the bore of the cylinder 14. The flange 21 is spaced from the end 22 of the shaft 6 and partly occupying the space between the flange 21 and the end of the shaft 6 is a shuttle valve 23 which may comprise a metal ring or an annulus formed from resilient material such as neoprene, the shuttle valve 23 providing an air-tight seal between the tubular member 19 and the cylinder 14. In the member 19 and close to the flange 21 are radial holes 24 so disposed that when the relief valve is closed, the holes 24 are covered by the shuttle valve 23. Spaced from these holes 24 are further radial holes 25 giving access from the interior of the tubular member 19 to the atmosphere. These holes 25 are so positioned that when the explosion disc 4 has moved to within substantially ½ inch of its maximum opening and the larger diameter part of the shaft 6 constituting the plunger has travelled into the bore of the cylinder 14, they are closed by the wall of the bore. A part 26 of the tubular member 19 extending outwardly from the flange 21 is arranged to co-operate with a ball 27 which is urged by a spring 28 against an annular seating 29 formed in the inner wall of the cylinder 14.

Screwed into the end of the cylinder 14 remote from the explosion disc 4 is an apertured cap 30 adapted to be connected to a pipe 31 supplying loaded air, the pressure of which may be approximately 100 lbs. per sq. in. Between the cap 30 and the ball valve is the helical spring 28 urging the ball 27 on its seating 29.

In order to absorb any shock when the relief valve is opened, the disc 4 may be furnished with a projecting neoprene ring 32 adapted to engage the dished plate 16 supporting the cylinder 14.

In operation, an increase of pressure in the furnace 2 due for example to an explosion therein will cause the explosion disc 4 to be un-seated, i.e. moved to the left in Figure 1. This movement takes place immediately the pressure reaches a fraction over atmospheric pressure. As the disc 4 moves to the left it carries the plunger with it and the plunger moves into the bore of the cylinder 14. The shuttle valve 23 remains stationary until the disc 4 and its plunger have moved a distance of about ⅛ inch. This allows any air in the cylinder 14 that may be compressed by the movement of the plunger to escape to the atmosphere through the radial holes 24, previously covered by the shuttle valve 23, the bore of the tubular member 19 and the other radial holes 25. Further movement of the disc 4 and the plunger causes the ball valve 27 to be unseated against the action of the loading spring 28 to allow the loading air to enter the cylinder 14, but since the cylinder is still open to the atmosphere as previously described, the loading air will not substantially retard the opening of the explosion disc 4. When however the disc 4 has travelled approximately two-thirds of its maximum opening the radial holes 25 extending through the plunger 19 and opening into the atmosphere will be closed by the inner wall of the cylinder 14 and the loading air will begin to take effect on the end of the plunger 19 within the cylinder 14. The air pressure at first brings the moving parts to rest without shock and then causes their direction of motion to be reversed to effect the closing of the relief valve. As the disc moves towards its closed position the shuttle valve 23 remains stationary, owing to friction between it and the bore of the cylinder, for the first ⅛" of travel and blanks the radial holes 24, so that when the plunger has travelled ½" and the radial holes 25 are uncovered the compressed air in the cylinder 14 cannot escape to atmosphere. Just prior to the explosion disc 4 reaching its closed position, the ball valve 27 will close, thus cutting off the supply of loading air to the cylinder 14, the closing operation being completed by the pressure of the air remaining in the cylinder 14. In practice, the area of the plunger, subjected to the loading air, and the area of the explosion disc 4 are so proportioned that the disc 4 will re-seat when the pressure in the furnace is about 0.8 lb. per sq. in. above atmospheric pressure.

Whilst the valve is primarily intended to open and close at just above atmospheric pressure, the inclusion of a spring mounted on the large diameter of the shaft 6 of appropriate strength will permit such actions to take place when the pressure in the furnace is substantially above atmospheric.

Whilst the actions are proceeding, the vacuum pumps will be sucking from the furnace 2 so that if the evolution of steam has diminished, the disc 4 may remain on its seat, and the pressure inside gradually drop. If the evolution of steam continues the explosion disc 4 will again be forced off its seating, as soon as the force on the inside is greater than that on the outside, and the sequence will continue until the evolution of steam does diminish.

Air remaining in the cylinder 14 after the ball valve 27 has closed will, after a few minutes, leak to the atmosphere and the relief valve will again be free to open should the pressure in the furnace rise appreciably above that of the atmosphere, but this pressure will be below the pressure at which the disc re-seats.

What I claim is:

1. A relief valve comprising a valve seat circumscribing a relief port, a disc normally seated in closed position on said seat, and held in the closed position by external atmospheric pressure, an external plunger fixedly carried by said disc to move with the disc, an external cylinder fixed relative to said seat and slidably receiving said plunger, a valve in the cylinder operable by the plunger to control the admission of loading air to the cylinder to close the relief valve after it has been opened, and means to delay the action of the loading air until the relief valve has been fully opened.

2. A relief valve for an electric furnace or other chamber, said relief valve comprising a valve seat adapted to be fixed relative to a chamber wall circumscribing a relief port through the wall, a disc normally seated on said seat closing said port and mounted for movement away from said seat responsive to excess pressure in the chamber to open said port and relieve said pressure, an external cylinder mounted in fixed relation with said seat and adapted for connection to an external source of fluid under pressure, a control valve connected in said cylinder for communication between the latter and said source of fluid under pressure and normally closed by the pressure of said fluid source, an external plunger carried by said disc and slidable in said cylinder upon opening movement of said disc to open said control valve, said control valve thereby communicating said fluid source to said plunger to urge the latter toward the closed position of said disc, and means to delay the action of said fluid source until said disc has moved to its fully open position.

3. A relief valve for an electric furnace or other chamber, said relief valve comprising a valve seat adapted to be fixed relative to a chamber wall circumscribing a relief port through the wall, a disc normally seated on said seat closing said port and mounted for movement away from said seat responsive to excess pressure in the chamber to open said port and relieve said pressure, an external cylinder mounted in fixed relation with said seat and adapted for connection to an external source of fluid under pressure, a control valve connected in said cylinder for communication between the latter and said source of fluid under pressure and normally closed by the pressure of said fluid source, an external plunger carried by said disc and slidable in said cylinder upon opening movement of said disc to open said control valve, said control valve thereby communicating said fluid source to said plunger to urge the latter toward the closed position of said disc, an internal projection on said disc extending in spaced relation through said port, mounting means fixed relative to said seat internally thereof slidably receiving said projection, and telescopic shields carried by said disc and mounting means protectively enclosing said projection.

4. A relief valve for an electric furnace or other chamber, said relief valve comprising a valve seat adapted to be fixed relative to a chamber wall circumscribing a relief port through the wall, a disc normally seated on said seat closing said port and mounted for movement away from said seat responsive to excess pressure in the chamber to open said port and relieve said pressure, an external cylinder mounted in fixed relation with said seat and adapted for connection to an external source of fluid under pressure, a control valve connected in said cylinder for communication between the latter and said source of fluid under pressure and normally closed by the pressure of said fluid source, and an external plunger carried by said disc and slidable in said cylinder upon opening movement of said disc to open said control valve, said control valve thereby communicating said fluid source to said plunger to urge the latter toward the closed position of said disc, said plunger having a longitudinal passageway opening laterally at its opposite ends for passing fluid from said source when said control valve is open until said passageway is closed by sufficient insertion of said plunger into said cylinder.

5. A relief valve according to claim 4, in combination with a shuttle valve slidable on said plunger to open and close the inner-end opening of said plunger passageway when said plunger is inserted into and withdrawn from said cylinder, respectively.

References Cited in the file of this patent

UNITED STATES PATENTS

| | | |
|---|---|---|
| 306,208 | Ashton | Oct. 7, 1884 |
| 635,150 | Schreidt | Oct. 17, 1889 |
| 1,369,050 | Quick | Feb. 22, 1921 |
| 1,952,646 | Ackermann | Mar. 27, 1934 |
| 2,803,423 | Erling | Aug. 20, 1957 |